(12) United States Patent
Smith et al.

(10) Patent No.: US 10,516,697 B2
(45) Date of Patent: *Dec. 24, 2019

(54) ISP BLACKLIST FEED

(71) Applicant: Level 3 Communications, LLC, Broomfield (CA)

(72) Inventors: Robert Smith, Irvine, CA (US); Shawn Marck, San Francisco, CA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,173

(22) Filed: Jan. 28, 2019

(65) Prior Publication Data

US 2019/0158534 A1    May 23, 2019

Related U.S. Application Data

(63) Continuation of application No. 14/991,010, filed on Jan. 8, 2016, now Pat. No. 10,193,922.

(60) Provisional application No. 62/102,939, filed on Jan. 13, 2015.

(51) Int. Cl.
   *H04L 29/06*    (2006.01)

(52) U.S. Cl.
   CPC ........ *H04L 63/1458* (2013.01); *H04L 63/101* (2013.01)

(58) Field of Classification Search
   CPC .......................... H04L 63/1458; H04L 63/101
   USPC ......................................................... 726/23
   See application file for complete search history.

(56) References Cited

U.S. PATENT DOCUMENTS

| 2003/0004688 A1 | 1/2003 | Gupta |
| 2003/0009699 A1* | 1/2003 | Gupta ..................... G06F 21/55 726/23 |
| 2006/0010389 A1 | 1/2006 | Rooney |
| 2006/0173992 A1 | 8/2006 | Weber |
| 2006/0230450 A1* | 10/2006 | Bu ....................... H04L 63/1416 726/22 |
| 2006/0236394 A1 | 10/2006 | Morrow et al. |
| 2006/0272018 A1 | 11/2006 | Fouant |
| 2006/0288413 A1 | 12/2006 | Kubota |
| 2007/0064610 A1 | 3/2007 | Khandani |
| 2007/0121596 A1 | 5/2007 | Kurapati et al. |
| 2007/0130619 A1 | 6/2007 | Reams |
| 2007/0149279 A1 | 6/2007 | Norden |
| 2008/0271146 A1 | 10/2008 | Rooney |
| 2009/0262741 A1 | 10/2009 | Jungck |

(Continued)

*Primary Examiner* — Khalil Naghdali

(57) ABSTRACT

Embodiments are provided for an actionable blacklist of DDoS offenders and ISPs associated offenders. The system can collect real-time attack data and perform real-time analysis, which can be fed into a centralized database for intelligent analysis to identify offenders and report to interested subscribers. The system can receive an indication that network resources are being targeted as part of one or more DDoS attacks, and then obtain the malicious IP address of devices associated with those DDoS attacks. The system can determine the Internet Service Provider (ISP) associated with malicious IP addresses. A metric can be computed that is associated with an ISP involved in the one or more DDoS attacks. If the metric exceeds a threshold, then an alert message indicating that the first ISP is involved in the one or more DDoS attacks can be sent to a list of subscribers.

19 Claims, 3 Drawing Sheets

(56) References Cited

U.S. PATENT DOCUMENTS

| | | |
|---|---|---|
| 2010/0095351 A1 | 4/2010 | Liu |
| 2010/0212005 A1 | 8/2010 | Eswaran |
| 2010/0229234 A1 | 9/2010 | Rouse |
| 2013/0152187 A1 | 6/2013 | Strebe |
| 2014/0173725 A1 | 6/2014 | Beryozkin |
| 2014/0373139 A1 | 12/2014 | Fu |
| 2015/0058976 A1 | 2/2015 | Carney |
| 2015/0082438 A1 | 3/2015 | Prieto Alvarez |
| 2015/0215334 A1 | 7/2015 | Bingham et al. |
| 2015/0326589 A1 | 11/2015 | Smith |
| 2015/0350229 A1 | 12/2015 | Mitchell |
| 2016/0044054 A1 | 2/2016 | Stiansen |
| 2016/0055335 A1 | 2/2016 | Herwono |
| 2016/0134639 A1 | 5/2016 | Kaminsky |
| 2016/0205134 A1 | 7/2016 | Smith et al. |
| 2016/0234249 A1 | 8/2016 | Wong |

\* cited by examiner

ISP BLACKLIST FEED

CROSS-REFERENCES TO RELATED APPLICATIONS

This application is a continuation of and claims the benefit of priority from U.S. patent application Ser. No. 14/991,010, filed Jan. 8, 2016, titled "ISP BLACKLIST FEED," the entire contents of which are fully incorporated by reference herein for all purposes. Application Ser. No. 14/991,010 claims the benefit of priority from U.S. Provisional Patent Application No. 62/102,939, filed Jan. 13, 2015, titled "ISP BLACKLIST FEED," the entire contents of which are fully incorporated by reference herein for all purposes.

BACKGROUND

In a network like the Internet, resources (e.g., pages of a website) may be requested by legitimate and malicious systems and persons alike. A distributed denial of service (DDoS) attack is an attempt to make resources of a network unavailable to legitimate users. A DDoS attack often involves multiple computers acting together to prevent a targeted website or service from functioning properly by having a group of multiple computers repeatedly request network resources of the website or service. This group of multiple computers is often referred to as a bot or botnet. A result of these repeated requests can be that a website or service has difficulty responding to legitimate requests due to an exhaustion of resources of a website's ability to serve content, and thus the website or service is effectively unavailable to legitimate users.

Generating and distributing reports of DDoS attacks for subscribers to gain certain insights can be an involved process. Existing reporting structures do not work in real-time and therefore do not provide subscribers the ability to make decisions on-the-fly that may help them mitigate imminent attacks. For example, sophisticated attackers can change locations and IP addresses between attacks, and therefore it can be less effective to block a "bad" IP address weeks or months after an attack.

Embodiments of the invention address these and other problems, individually and collectively.

BRIEF SUMMARY

Embodiments can provide an actionable blacklist of DDoS offenders and ISPs that the offenders are associated with. An example system is able to collect data in real-time and do real-time analysis of attack data for customers. The collected data can be fed into a centralized database for intelligent analysis to identify offenders and report to interested customers. The system can receive an indication that network resources are being targeted as part of one or more DDoS attacks, and then obtain the malicious IP address of devices associated with those DDoS attacks. The system can send a request to a database system to determine the Internet Service Provider (ISP) associated with each of the one or more malicious IP addresses. A metric can be computed that is associated with an ISP involved in the one or more DDoS attacks, for example: an amount of malicious IP addresses of the ISP. If the metric exceeds a threshold, then an alert message indicating that the first ISP is involved in the one or more DDoS attacks can be sent to a list of subscribers.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
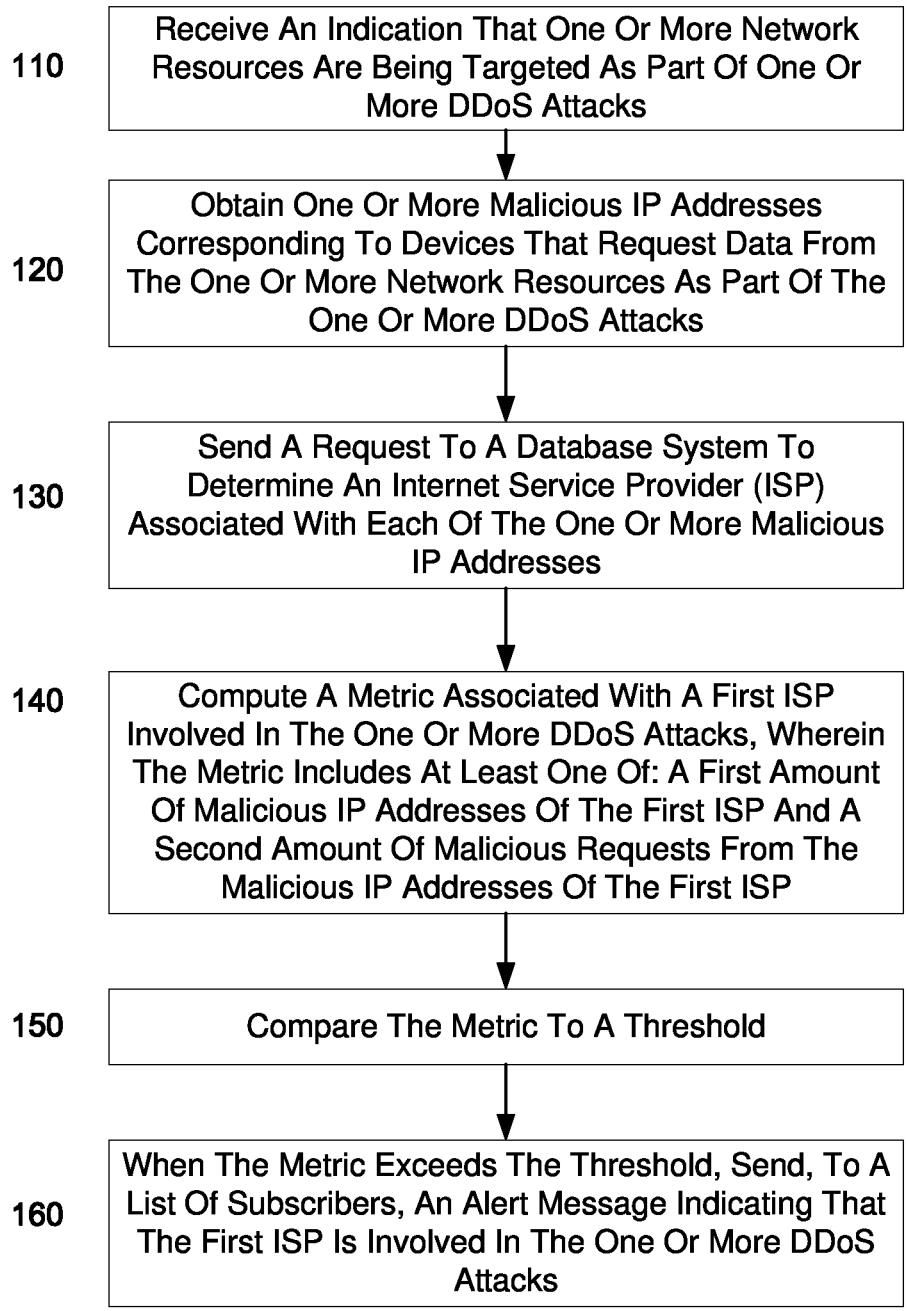
FIG. 1 is a flowchart of a method 100 of providing a notification containing an ISP from which DDOS attacks originate according to embodiments of the present invention.

When monitoring DDoS attacks, periodic (e.g. quarterly) compilation reports of DDoS attacks may be issued for subscribers to gain certain insights, but these periodic reports do not work in real-time. Existing DDoS mitigation solutions do not report collected data in real time, and thus information about the IP addresses (i.e. source) of the attacks cannot be analyzed and used effectively. Attackers can change locations and IP addresses between attacks, thus blocking bad addresses weeks or months after an attack, when the data has been released in a quarterly report, can be an ineffective method.

The collected data can be fed into a centralized database for intelligent analysis to hone in on offenders. The analysis can answer many questions about an attack that would be of interest to subscribers. These questions may include, but are not limited to, whether the IP address of a particular attacker is already in the database, whether the attack is a live attack, where the attack is coming from, whether the attack is coming from the same IP address, how many places is the attack coming from (to determine geometric vectors), does an attack from this address happen frequently, and is the attack coming from a real IP address.

After the data is collected and analyzed, the system can send out notifications to certain members of the Internet community to say that certain offenders are being seen, thereby allowing customers and/or transit providers to block them.

There is a need to stop current attacks in their tracks by creating an actionable blacklist of DDoS offenders. There is also a need to further analyze individual IP addresses to determine which Internet Service Provider (ISP) one or more IP addresses correspond to. Notifications containing the ISPs and IP addresses that are commonly used by attackers can be sent out to interested parties.

I. Attack Identification

The system can include one or more net flow analyzer devices that send indications that one or more network resources of a customer are under attack. The net flow analyzers can provide their data to the system, e.g., in various formats including raw data and analytics. The devices can provide APIs that specify the format for data retrieval. The data can consist of attack data over various time intervals.

Examples of net flow analyzers include various network traffic analyzers (NTAs), whose data includes raw data and analytics from vendors such as NSFOCUS, Corero, and Arbor. In these systems, net flow analyzers can collect net flow traffic data and conduct analysis. If DDoS attack traffic is detected, a net flow analyzer can trigger alerts, and send the alerts to anomaly detection systems (ADSs), which can be used for traffic filtering and cleaning. If there is an attack, the NTA can determine that there is excessive traffic from the attacker based on the flow analysis sampling of data from the attacker's IP addresses and can determine that there is an attack in progress.

Whenever there is an attack (e.g., a volumetric attack), net flow analyzer equipment can identify the IP address, and thus, the system can identify real-time IP addresses that have been identified as being part of a DDoS attack, e.g., due to the behavior and/or an amount of traffic.

Those IP addresses can be further captured by a server, or sent to a server by net flow analyzers. This server would allow for additional analysis and aggregation of the IP attack data. Multiple IP addresses could be part of the same attack, and often are.

II. Attack Analysis and Notification

A. Method

FIG. 1 is a flowchart of a method 100 of providing a notification containing an ISP from which DDOS attacks originate according to embodiments of the present invention. Method 100 can be performed by a mitigation system, which may include one or more of any of edge routers, mitigation devices (e.g. attack monitoring platforms or scrubbing centers), and a central server.

The system can take the IP address and related attack data and besides using it for scrubbing, can feed it to a server, which can place the attack data (including the IP address) and store the data in a database; that database can be part of a distributed environment and used for further analysis. This analysis can include determining instances where the system sees the same IP addresses showing up, and in how many places. The analysis can determine whether the IP addresses are concentrated in a certain geographic region, associated with a particular ISP and/or prefix of an ISP, and whether an address is a spoofed IP address or a real IP address, e.g., by the way the data is being distributed around.

At block 110, a computer system receives an indication that one or more network resources are being targeted as part of one or more DDoS attacks. The indication can come from one or more mitigation devices that can provide their data to the system, e.g., in various formats. These mitigation devices can be external systems including anomaly detection systems (ADSs) and network traffic analyzers (NTAs), whose data includes raw data and analytics. The mitigation devices can provide APIs that specify the format for data retrieval from the devices or for sending the data to the computer system. The data can consist of raw attack data and analytics over various time intervals.

At block 120, one or more malicious IP addresses corresponding to devices that request data from (or transceive data with) the one or more network resources as part of the one or more DDoS attacks is obtained. The system can extract the IP addresses from the requests to be used in further analysis.

The system can gather these IP addresses from one or several different net flow analyzers. There may be three, four, five, ten, or more net flow analyzers around the world. Each net flow analyzer can identify bad IP addresses to scrubbers or mitigation devices, and also the IP addresses can be saved to a database for further analysis. The system can aggregate those IP addresses and is able to provide additional analysis, including which ISPs that one or more of the IP addresses is associated with. Once the system determines that the addresses are bad IP addresses, the system may be proactive and start telling other internet devices that these are bad IP addresses, and thus the other device can go ahead and start acting on them.

At block 130, a request is sent to a database system to determine an ISP associated with each of the one or more malicious IP addresses. The database can contain a table which maps IP addresses or address ranges to the associated ISP. With the ISP identified, the system can store the associated ISPs in the database. The database can be queried to determine the percentage of offending IP addresses belonging to each ISP, in order to calculate a percentage of offending IP addresses. The database system can be inside the mitigation or external to the mitigation system, e.g., a publicly available database system on the Internet.

The analysis can look at a group of IP addresses and determine if the addresses are associated with the same ISP. The system could look at those IP addresses belonging to the same IPv4/24 prefix or similar and determine out of those IP addresses how many of them are owned by the same ISP or company and group the IP addresses. The system can also reach out to Internet-based services in an automated fashion to determine the IP address prefixes, which includes the malicious address, and determine the ISP responsible for the prefix group. The system could be interested in groups that are larger than a certain size. If there are more IP addresses coming from the same place, an expanded search to determine additional information can be conducted.

Additional details about specific IP addresses could come from lookups in database tables where an IP address can be associated with its owner. The database can also contain information about IP addresses including who owns an IP address and how many times does this particular owner's name appear in reports and at what frequency. Further analysis could determine if the number of IP addresses that are identified with this ISP have been on the increase, possibly indicating that the ISP is frequently used by attackers, or conversely if the number is on a downward trend, possibly indicating that an ISP that is working hard in making sure that their company is not associated with attackers.

At block 140, a metric associated with a first ISP involved in the one or more DDoS attacks is computed, wherein the metric includes at least one of: a first amount of malicious IP addresses of the first ISP and a second amount of malicious requests from the malicious IP addresses of the first ISP. The metric could be any relevant value used to determine whether the level of activity warrants sending an alert to a list of subscribers. For example, an amount of malicious IP addresses of the ISP, volume of requests, time range of requests, etc. This data can be collected and tabulated for example by determining the percentage of offending IP addresses within each prefix group, or the percentage of offending IP addresses within an entire bank of addresses controlled by an ISP. The amount of requests can be used in case there are a few IP addresses that are submitting a particularly high number of malicious requests.

The metric can be computed periodically where each computed metric corresponds to malicious requests within a different time window. The time window can be a programmable time window. This may include a moving time window for collecting the malicious request information over a period of time, e.g., to ensure that any reported ISP has a persistent problem of offenders or to afford the system the insight to avoid any over-reaction to temporary issues with any ISP.

At block 150, the metric is compared to a threshold. The threshold can be different for different subscribers. The threshold can be set so that only ISPs with a sufficiently high number of requests and/or bad IP addresses are identified. If both amounts of IP addresses and IP requests are used, then separate thresholds could be required for both. Or, the two amounts can be combined (e.g., as part of weighted sum) and a combined threshold can be used.

The system can look at the total rate across all net flow analyzers that are in the system. The analysis could determine how many different net flow analyzers are actually seeing certain IP addresses to see how bad a particular IP address is. Since in DDOS attacks malicious software utilizes a plurality of bot machines to attack, there might not be a specific ISP that can be identified. If, for example there are a thousand source IPs conducting the attack and a thousand unwilling participants, those IP addresses are perhaps not going to point to a particular ISP. The system could still analyze and see exactly how bad the IP addresses are. The system can decide that even though it is blocking the IP address at this current moment, the attack from the IP address is not bad enough so as to disseminate information regarding that IP to other customers that may act on their own even though they are not getting attacked, as the attack has not reached a high enough level.

At block 160, when the metric exceeds the threshold, a list of subscribers is sent an alert message indicating that the first ISP is involved in the one or more DDoS attacks. In such a case, additional information is stored in the database regarding any notices that were sent.

The data could be analyzed in an automatic fashion, or it could be analyzed and sent out on a periodic basis, for example, every half hour or five or ten minutes. The recipients of these reports shall elect what action they may want to take based on the information. They might program their computers to actually act on information immediately, based on the contents of the reports. The reports could specify if the level of danger of the attacks, for example, high level, medium level, low level.

If the system sees an IP address at multiple net flow analyzers by aggregating, the system, based on certain criteria may elect to perform further analysis, in addition to the analysis which might have been performed by the Net Flow Analyzer. The system is able to apply different classifications to IP addresses and ISPs, and to stratify the IP addresses and ISPs that are under various levels of attack. For example, the system can rank IP addresses and ISPs over time and frequency. The system could also identify to the IP address that their computer has been compromised, that they are on this list of bad IP addresses and they therefore might want to run some extra software to clean out their system.

In the case of individual IP addresses, if their computer is running slow or their IP is being shut down or is having problems, an ISP could provide an interface for the owner of that IP to see if they appear on attack lists or any kind of a bad list. An ISP might provide notice at the bottom of a customer bill, telling the customers that they can log into the panel and check and see if their computer appears as possibly compromised to malware. The users can log in to see if their IP or computers are on any list. The ISP would already know because it is part of their IP address.

An ISP could also push out notices to a customer saying that their address has been identified as one that sends out attacks, and that the customer should take appropriate action. The ISP could also give thirty days' notice to their customer regarding the problem. In the case of ISPs it would be that the system is identifying ISPs as being a problem. ISPs could want to know if their organization appears on any list and then any potential new customers or existing customers can check if an ISP appears on any list. Both the customer and ISP want to make sure that there is not a singular collective report against the ISP.

B. System

Figure 2:
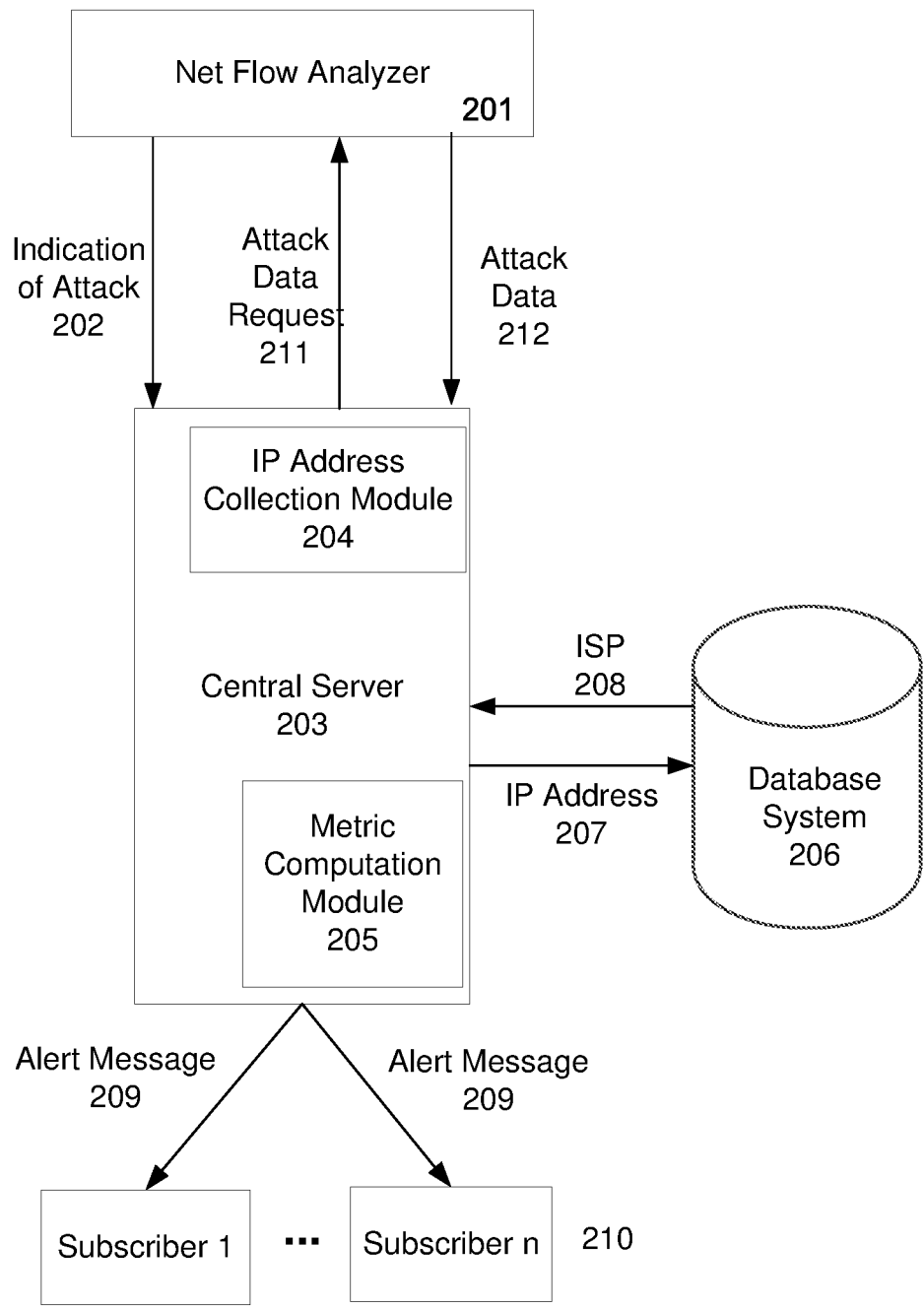
FIG. 2 is a system diagram showing analysis, storage, and distribution of DDoS attack data and related notifications.

FIG. 2 is a system diagram showing analysis, storage, and distribution of DDoS attack data and related notifications. Net Flow Analyzer 201 can detect an attack in progress and send an Indication of Attack 202 to Central Server 203. Indication of Attack 202 may contain data concerning the attack, or Central Server 203 may send Attack Data Request 211 to Net Flow Analyzer 201. The request uses APIs that specify the format for data retrieval. Net Flow Analyzer 201 responds to the request by sending Attack Data 212. IP Address Collection Module 204 is used to determine whether the request should be sent to Net Flow Analyzer 201 for attack data, and to collect IP addresses related to an attack. Central Server 203 sends IP Address 207 to Database System 206 to determine ISP 208 that IP Address 207 is associated with. Metric Computation Module 205 computes metrics related to collected IP addresses and determined ISPs. If the metrics computed exceed a threshold, Central Server 203 can send Alert Message 209 to one or more Subscriber 210.

The system could send a notification to the owner of a/24 address block saying that they have some customers or somebody who fell within that family of addresses that has been involved in an attack, that those addresses are blocked.

The System can tabulate the frequency of IP addresses which appear in attacks, and develop a severity matrix by IP address.

The system can also take into account the currency of the data related to specific IPs and ISPs. If there is attack data from a long period of time ago, that data could be considered to be less relevant, and weighed differently in terms of ranking IPs and ISPs, and not pushing them up as high on a list.

In addition to moving IPs and ISPs down the list when there have not been recent attacks, involving the IP and ISPs, the system can also remove IP addresses or ISPs if additional negative information is not received. These determinations can be made utilizing consumer configurable variable thresholds.

III. Computer System

Figure 3:
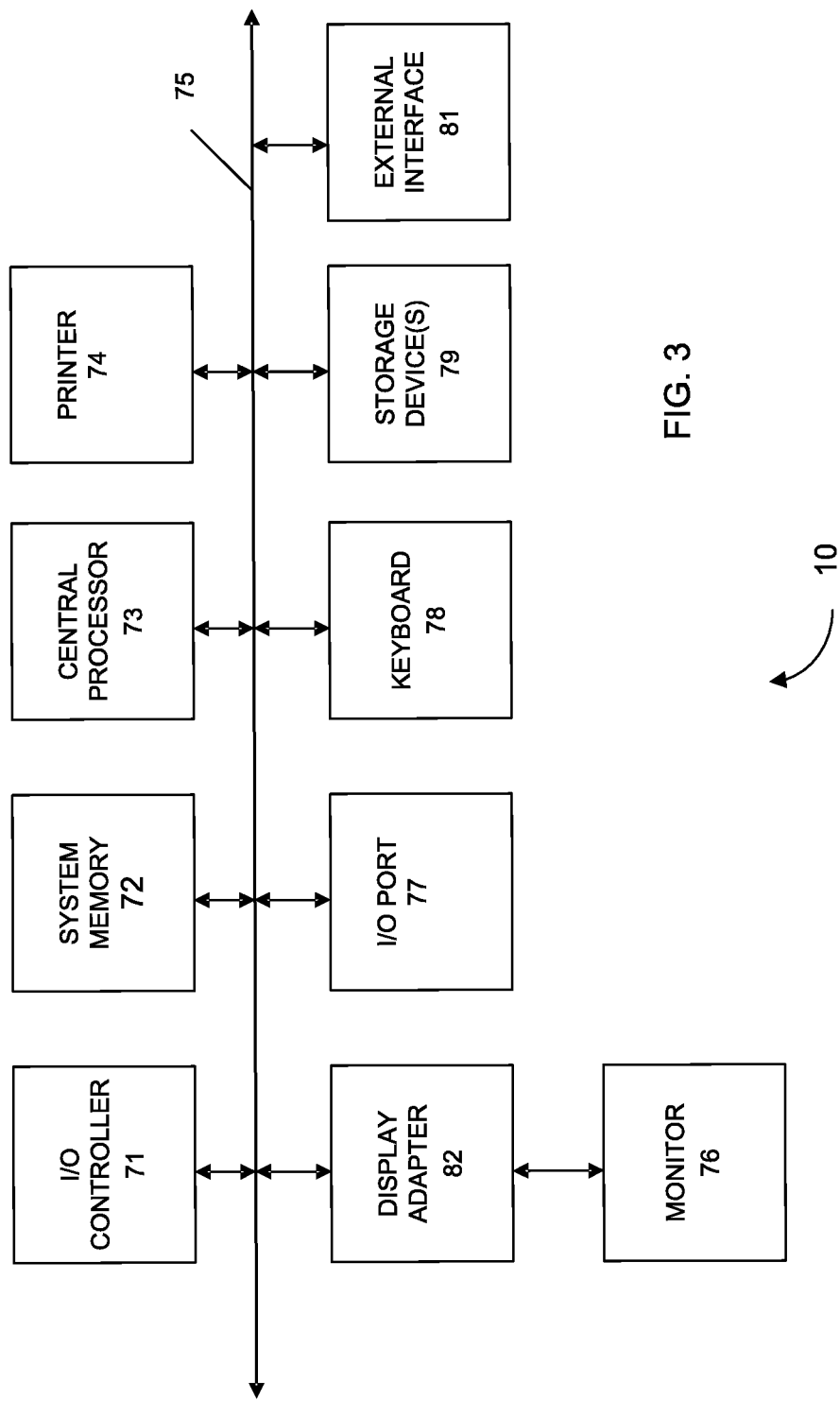
FIG. 3 shows a block diagram of an example computer system 10 usable with system and methods according to embodiments of the present invention.

Any of the computer systems mentioned herein may utilize any suitable number of subsystems. Examples of such subsystems are shown in FIG. 3 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 3 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method of providing a notification containing an ISP from which DDoS attacks originate, the method comprising performing by a computing system:
   receiving an indication that one or more network resources are being targeted as part of one or more DDoS attacks;
   obtaining one or more malicious IP addresses corresponding to devices that transceive data with the one or more network resources as part of the one or more DDoS attacks;
   sending a request to a database system to determine an Internet Service Provider (ISP) associated with each of the one or more malicious IP addresses;
   computing a metric associated with a first ISP involved in the one or more DDoS attacks, wherein the metric includes at least one of: a first amount of malicious IP addresses of the first ISP and a second amount of malicious requests from the malicious IP addresses of the first ISP;
   comparing the metric to a threshold; and
   when the metric exceeds the threshold, sending, to a list of subscribers, an alert message indicating that the first ISP is involved in the one or more DDoS attacks.

2. The method of claim 1, wherein the indication is received from one or more anomaly detection systems.

3. The method of claim 1, wherein the indication is received from one or more network traffic analyzers.

4. The method of claim 1, wherein the one or more malicious IP addresses are obtained from net flow analyzer equipment.

5. The method of claim 1, wherein the one or more malicious IP addresses are obtained from the received indication.

6. The method of claim 1, wherein the one or more malicious IP addresses are obtained from one or more net flow analyzer devices.

7. The method of claim 1, wherein the computer system includes the database system.

8. The method of claim 1, wherein the database system is separate from the computer system.

9. The method of claim 1, wherein the metric includes an amount of malicious IP addresses of the first ISP.

10. The method of claim 1, wherein the metric includes a quantity of malicious requests from the malicious IP addresses of the first ISP.

11. The method of claim 1, wherein the metric includes a percentage of malicious IP addresses belonging to a prefix group.

12. The method of claim 1, wherein the metric includes a percentage of malicious IP addresses belonging to the first ISP.

13. The method of claim 1, wherein the metric includes a volume of requests belonging to the first ISP.

14. The method of claim 1, wherein the metric includes a time range of requests.

15. The method of claim 1, wherein malicious request data for computing the metric is collected based on a moving programmable time window.

16. The method of claim 15, wherein the programmable time window is a moving time window.

17. The method of claim 1, further comprising sending a message to one or more subscribers indicating that their machines have been compromised.

18. The method of claim 1, further comprising sending a message to a subscriber ISP indicating that one or more of their machines have been compromised.

19. A system for providing a notification containing an ISP from which DDoS attacks originate, the system comprising:
- at least one processor communicably coupled to a memory, wherein the memory is operable to store instructions for execution by the at least one processor, the at least one processor operable to execute the instructions to perform the steps of:
- receiving an indication that one or more network resources are being targeted as part of one or more DDoS attacks;
- obtaining one or more malicious IP addresses corresponding to devices that transceive data with the one or more network resources as part of the one or more DDoS attacks;
- sending a request to a database system to determine an Internet Service Provider (ISP) associated with each of the one or more malicious IP addresses;
- computing a metric associated with a first ISP involved in the one or more DDoS attacks, wherein the metric includes at least one of: a first amount of malicious IP addresses of the first ISP and a second amount of malicious requests from the malicious IP addresses of the first ISP;
- comparing the metric to a threshold; and
- when the metric exceeds the threshold, sending, to a list of subscribers, an alert message indicating that the first ISP is involved in the one or more DDoS attacks.

* * * * *